US008238016B2

(12) United States Patent
Wu et al.

(10) Patent No.: US 8,238,016 B2
(45) Date of Patent: Aug. 7, 2012

(54) PHOTOVOLTACHROMIC DEVICE AND THE APPLICATION THEREOF

(75) Inventors: Jih-Jen Wu, Tainan (TW); Min-Da Hsieh, Taipei (TW); Wen-Pin Liao, Taichung (TW); Wei-Ting Wu, Tainan County (TW); Jen-Sue Chen, Tainan (TW); Jow-Lay Huang, Tainan (TW)

(73) Assignee: National Cheng Kung University, Tainan (TW)

( * ) Notice: Subject to any disclaimer, the term of this patent is extended or adjusted under 35 U.S.C. 154(b) by 186 days.

(21) Appl. No.: 12/758,035

(22) Filed: Apr. 12, 2010

(65) Prior Publication Data

US 2010/0259811 A1 Oct. 14, 2010

(30) Foreign Application Priority Data

Apr. 13, 2009 (TW) ................................ 98112234 A

(51) Int. Cl.
*G02F 1/153* (2006.01)
*H01L 31/00* (2006.01)

(52) U.S. Cl. ........................................ 359/275; 136/263

(58) Field of Classification Search .......... 359/265–275; 136/252, 243, 244, 255, 256, 260, 262, 263
See application file for complete search history.

(56) References Cited

U.S. PATENT DOCUMENTS

| 3,704,057 | A  | * | 11/1972 | Beegle ........................... 359/275 |
| 6,246,505 | B1 | * | 6/2001 | Teowee et al. ................. 359/241 |
| 7,825,250 | B2 | * | 11/2010 | Kakuta et al. ................... 546/10 |
| 7,872,791 | B2 | * | 1/2011 | Karmhag et al. ............. 359/265 |
| 8,049,105 | B2 | * | 11/2011 | Kuroda et al. ................ 136/263 |
| 2003/0140959 | A1 | | 7/2003 | Gaudiana et al. |
| 2009/0211638 | A1 | * | 8/2009 | Park et al. ..................... 136/262 |
| 2010/0133111 | A1 | * | 6/2010 | Nocera et al. ................. 205/633 |

* cited by examiner

*Primary Examiner* — Ricky Mack
*Assistant Examiner* — Tuyen Tra
(74) *Attorney, Agent, or Firm* — CKC & Partners Co., Ltd.

(57) ABSTRACT

A photovoltachromic device includes a photoelectrode, a counter electrode electrically connected to the photoelectrode, and an electrolyte layer disposed between the photoelectrode and the counter electrode. The photoelectrode includes a first transparent electrode, an electron-transport layer disposed on the first transparent electrode, and a sensitizing layer disposed on the electron-transport layer. The counter electrode includes a second transparent electrode and an electrochromic layer disposed on the second transparent electrode. The second transparent electrode contacts both of the electrolyte layer and the electrochromic layer thereby accelerating the response times for coloring and bleaching the photovoltachromic device.

11 Claims, 9 Drawing Sheets

PHOTOVOLTACHROMIC DEVICE AND THE APPLICATION THEREOF

RELATED APPLICATIONS

This application claims priority to Taiwan Application Serial Number 98112234, filed Apr. 13, 2009, which is herein incorporated by reference.

BACKGROUND

1. Field of Invention

The present invention relates to a photovoltachromic device. More particularly, the present invention relates to a photovoltachromic device with fast response times.

2. Description of Related Art

The concept of electrochromism was presented in 1961, i.e. an electrochromic material will change its color when a voltage is applied thereto. For example, when being illuminated with visible light, an electrochromic device will block the light of specific wavelengths from passing therethrough, thereby preventing excess light from passing through the electrochromic device and adjusting quantities of incident light of different wavelengths.

An electrochromic layer may be enabled using an organic compound, such as viologen or pyrodine, or inorganic compound, such as inorganic transition metal compounds $WO_3$, $MoO_3$ and $V_2O_5$. According to various optical properties of an electrochromic device, the electrochromic device can be applied on smart windows for adjusting the quantity of incident sunlight, automobile anti-dazzling rear view mirrors, automobile sunroofs, static display devices or digital displays, etc.

Referring to FIG. 1, FIG. 1 is a schematic cross-sectional view illustrating a conventional photovoltachromic device 100. The photovoltachromic device 100 includes a first transparent electrode 110, a first transparent substrate 112, a second transparent electrode 120, a second transparent substrate 122, an electron-transport layer 130, an electrochromic layer 140 and an electrolyte layer 150. The first transparent substrate 112 is used to support the first transparent electrode 110. The second transparent substrate 122 is used to support the second transparent electrode 120. The second transparent electrode 120 is electrically connected to the first transparent electrode and disposed facing the first transparent electrode 110. The electron-transport layer 130 is disposed on a surface facing the second transparent electrode 120 of the first transparent electrode 110, and the electron-transport layer 130 has a sensitizing layer 132 adsorbed thereon. The electrochromic layer 140 covers the second transparent electrode 120 entirely, thereby totally separating the second transparent electrode 120 from the electrolyte layer 150, i.e., there is no surface area of the second transparent electrode 120 contacting the electrolyte layer 150. The electrolyte layer 150 includes a redox pair and is disposed between the first transparent electrode 110 and the second transparent electrode 120.

Light illumination can excite the sensitizing layer 132 to generate photoelectrons, such that the electrochromic layer 140 is colored by generating a potential difference, thereby enabling the electrochromic layer 140 to achieve desired optical features.

Under the conditions of external circuit shorted or no light illumination, the electrochromic layer will bleach gradually but very slowly. Hence, the photovoltachromic device has the disadvantages of poor light response time and inconvenient operation. Further, the conventional photovoltachromic device 100 does not have obvious photovoltaic characteristics and thus cannot be finely tuned for coloring.

SUMMARY

It is an aspect of the present invention to provide a photovoltachromic device to overcome or improve the aforementioned problems.

According to the aspect of the present invention, a photovoltachromic device is provided. The photovoltachromic device includes a photoelectrode, a counter electrode electrically connected to the photoelectrode, and an electrolyte layer disposed between the photoelectrode and the counter electrode. The photoelectrode includes a first transparent electrode, an electron-transport layer disposed on the first transparent electrode, and a sensitizing layer disposed on the electron-transport layer. The counter electrode electrically connected to the photoelectrode includes a second transparent electrode and an electrochromic layer disposed on the second transparent electrode. The second transparent electrode contacts the electrolyte layer and the electrochromic layer.

According to the aspect of the present invention, a photovoltachromic device is further provided. The photovoltachromic device includes a photoelectrode, a counter electrode electrically connected to the photoelectrode, an electrolyte layer disposed between the photoelectrode and the counter electrode. The counter electrode includes a second transparent electrode, an electrochromic layer disposed on the second transparent electrode and an auxiliary conductive catalyst layer disposed on the second transparent electrode. The auxiliary conductive catalyst layer contacts the electrolyte layer and the electrochromic layer.

According to the aspect of the present invention, a smart window is provided. The window includes a window main body including one of the aforementioned photovoltachromic devices and a frame for fixing the window main body.

Since the electrochromic reaction of the aforementioned photovoltachromic device is performed under the condition that there is a transparent electrode contacting the electrolyte layer or an auxiliary conductive catalyst layer contacting the electrolyte layer, the rate of ion pair reduction in the electrolyte layer is increased. Therefore, the coloring and bleaching response times of the photovoltachromic device can be reduced greatly. Moreover, the present invention integrates the dye-sensitized nano-structured technology with the electrochromic coating technology according to one embodiment of the present invention. The coloration of electrochromic material is attained with the solar power so as to save power.

Furthermore, the photovoltachromic devices can be applied to electric devices, such as dye-sensitized cells and displays, or energy-saving products.

BRIEF DESCRIPTION OF THE DRAWINGS

The invention can be more fully understood by reading the following detailed description of the embodiment, with reference made to the accompanying drawings as follows.

DETAILED DESCRIPTION

The above and other objects, aspects and advantages of the present invention will become apparent from the following description of embodiments. It should be noted that the present disclosure is to be considered an exemplification of the invention and is not intended to limit the invention.

Figure 2A:
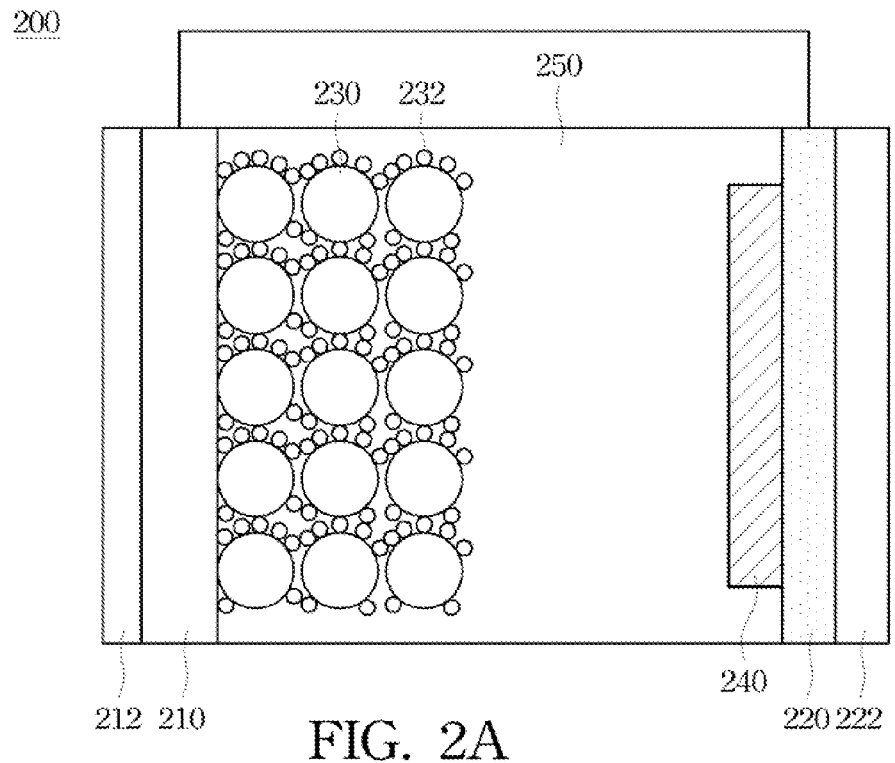
FIG. 2A is a schematic cross-sectional view illustrating a photovoltachromic device according to one embodiment of the present invention.
Figure 2B:
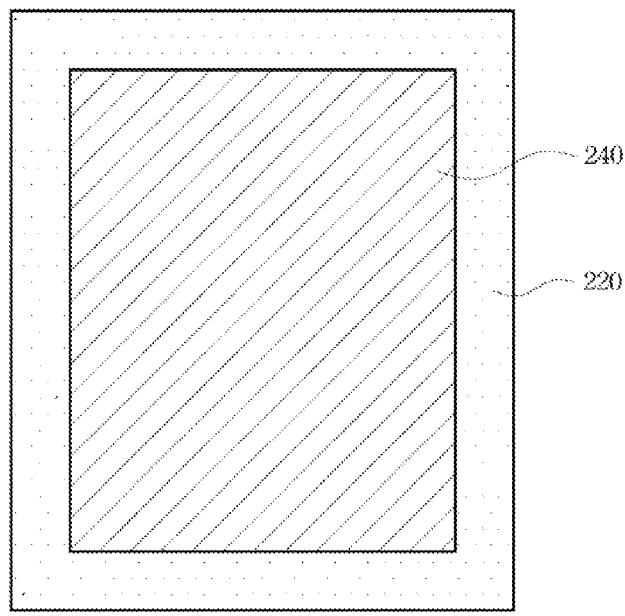
FIG. 2B is a top view illustrating a counter electrode of the photovoltachromic device shown in FIG. 2A.

FIG. 2A illustrates the photovoltachromic device 200 according to one embodiment of the present invention. FIG. 2B illustrates the counter electrode of the photovoltachromic device 200 according to one embodiment of the present invention. In this embodiment, the photovoltachromic device 200 includes a first transparent electrode 210, a second transparent electrode 220, an electron-transport layer 230 (with a sensitizing layer 232 adsorbed thereon), an electrochromic layer 240 and an electrolyte layer 250. The first transparent electrode 210, the electron-transport layer 230 and the sensitizing layer 232 that are disposed thereon constitute a photoelectrode, and the second transparent electrode 220 and the electrochromic layer 240 that is disposed thereon constitute a counter electrode.

In this embodiment, the photovoltachromic device 200 further includes a first transparent substrate 212 used to support the first transparent electrode 210, and a second transparent substrate 222 used to support the second transparent electrode 220. The first transparent substrate 212 and the second transparent substrate 222 can be formed from glass or other transparent insulating materials including but not limited to plastic.

As shown in FIG. 2A, the second transparent electrode 220 is electrically connected to the first transparent electrode 210 and disposed facing the first transparent electrode 210. The electron-transport layer 230 is disposed on the first transparent electrode 210 and faces the second transparent electrode 220, and the electron-transport layer 230 has a sensitizing layer 232 adsorbed on the electron-transport layer 230. The electrochromic layer 240 is disposed on the second transparent electrode and faces the first transparent electrode 210. The electrolyte layer 250 is provided with a radox pair, such as $I^-/I_3^+$, disposed between the first transparent electrode 210 and second transparent electrode 220.

As shown in FIG. 2B, it is noted that only a portion of the electrochromic layer 240 covers the second transparent electrode 220 such that at least one portion of the second transparent electrode 220 is exposed among the electrochromic layer 240 and contacting the electrolyte layer 250. (as shown in FIG. 2A)

In the photovoltachromic device 200 of this embodiment, the first transparent electrode 210 is formed from indium tin oxide (ITO), and the second transparent electrode 220 is formed from fluorine tin oxide ($SnO_2$: F). In another embodiment, the first transparent electrode 210 and the second transparent electrode 220 may be formed from the same material or different materials, such as tin dioxide, indium tin oxide, antimony tin oxide, fluorine tin oxide, iridium tin fluoride, zinc oxide, a conductive carbon compound and the combination thereof. Alternatively, in some embodiments, the second transparent electrode 220 may be formed from platinum.

The electron-transport layer 230 may be implemented using nanoporous titanium dioxide film which is formed on the first transparent electrode 110 by spin coating. Alternatively, in another embodiment, the electron-transparent layer 230 may be implemented using nanoporous zinc oxide film. The aforementioned nanoporous films can be formed by using various coating processes, such as electroplating, spraying and chemical plating, which are merely used as examples for explanation, but not to limit the present invention. The nanoporous films suitable for use in the present invention can be referred to U.S. Pat. No. 6,369,934, whose disclosure is incorporated herein by reference. In another embodiment, the electron-transport layer 230 can be substituted by mesoscopic networks of $TiO_2$ nanoparticles or zinc oxide (ZnO) nanowires. In some embodiments, the mesoscopic networks of $TiO_2$ nanoparticles (or ZnO nanowires) can be combined with quantum dots to form a quantum-dot-sensitized photoelectrode.

The sensitizing layer 232 may be formed from the quantum dots or light-absorbing dyes. The quantum dots are formed from a material selected from the group consisting of cadmium selenide (CdSe), cadmium sulfide (CdS), indium phosphide (InP) and indium arsenide (InAs). The light-absorbing dyes may be formed from a transition metal complex or an organic dye. In this embodiment, the sensitizing layer 232 is formed from an organic dye, e.g. Ru-base dye molecules provided with an absorption spectrum ranging from 400 nm to 900 nm. Alternatively, in another embodiment, the light-absorbing dye may be Os-based dye molecules. The light-absorbing dye suitable for use in the present invention can be referred to U.S. Pat. No. 6,369,934, whose disclose is incorporated herein by reference.

In the photovoltachromic device 200 of this embodiment, the electrochromic layer 240 may be formed from tungsten oxide ($WO_3$). In another embodiment, the electrochromic layer 240 may be formed from a transition metal oxide or transition metal cyanide, such as molybdenum oxide, nickel oxide, vanadium oxide, titanium oxide or Prussian blue. Alternatively, the electrochromic layer 240 can be formed from an organic compound, such as viologen compound, or conjugated conductive polymers, such as polyethylene dioxythiophene (PEDOT), polyaniline (PAn) and polythiophene (PT).

The electrolyte layer 250, which can be in liquid state, solid state or colloid state, is used for conducting ions. The electrolyte layer 250 includes a redox pair and a positive ion selected from the group consisting of $Li^+$ ion, $Na^+$ ion, $K^+$ ion and $H^+$ ion. In this embodiment, the electrolyte layer 250 is enabled using a salt solution containing lithium iodide that can be dissociated into $Li^+$ ion and $I^-$ anion in solution.

Referring to FIG. 2A, the photovoltachromic device 200 absorbs solar energy under light illumination of different wavelengths via the light-absorbing dye 232. The photoelectrons excited in the light-absorbing dye 232 can transfer to the electrochromic layer 240 through the path of the electron-transport layer 230, an external circuit (not shown) and transparent electrode 220, and make the $Li^+$ in the electrolyte layer 250 combine with $WO_3$ to form colored $Li_xWO_3$, thereby changing the transmittance of the electrochromic layer 240. After the electrons are transferred to the transparent electrode 220 by an external circuit and transferred to the electrolyte layer 250 via the exposed transparent electrode 220, the $I_3^-$ anion in the electrolyte, which is formed by oxidation of I– for dye regeneration, is reduced back to $I^-$ anion on the transparent electrode 220, thereby continuously transforming solar energy into electrical energy.

Figure 3A:
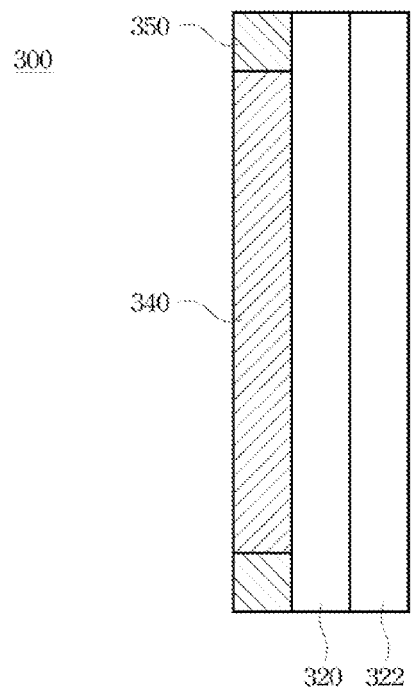
FIG. 3A is a schematic cross-sectional view illustrating a photovoltachromic device according to another embodiment of the present invention.
Figure 3B:
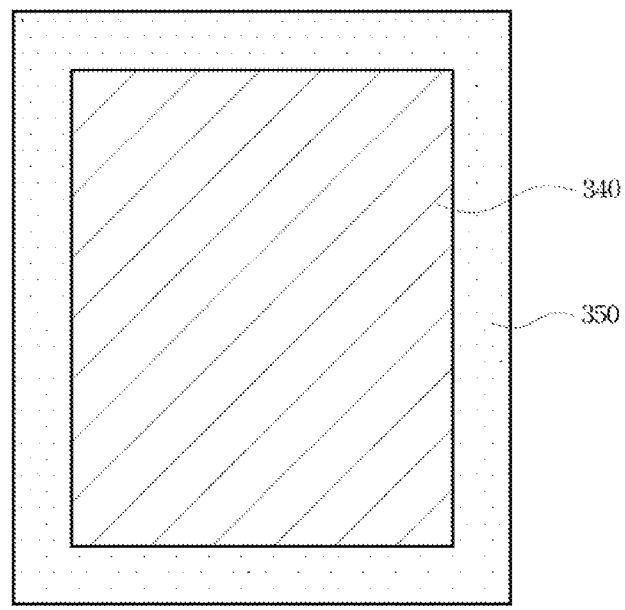
FIG. 3B is a top view illustrating a counter electrode of the photovoltachromic device shown in FIG. 3A.

FIGS. 3A and 3B illustrate a counter electrode of the photovoltachromic device 300 according to another embodiment of the present invention. The photovoltachromic device 300 is substantially identical to the photovoltachromic device 200 of FIG. 2A. The difference between these two photovoltachromic devices is that the counter electrode of the photovoltachromic device 300 further includes an auxiliary conductive catalyst layer 350 disposed on the second transparent electrode 320 and contacting the electrolyte and electrochromic layer 340. In this embodiment, the auxiliary conductive catalyst layer 350 may be formed from platinum. Furthermore, in another embodiment, the auxiliary conductive catalyst layer 350 may be formed from tin dioxide, indium tin oxide, antimony tin oxide, fluorine tin oxide, iridium tin fluoride, zinc oxide, a conductive carbon compound and the combination thereof.

Figure 4A:
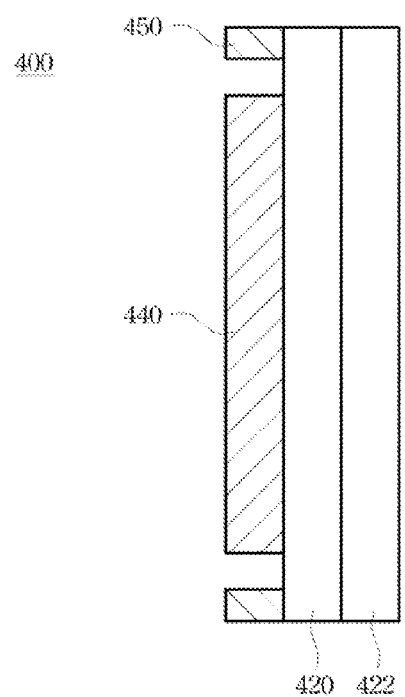
FIG. 4A is a schematic cross-sectional view illustrating a photovoltachromic device according to another embodiment of the present invention.
Figure 4B:
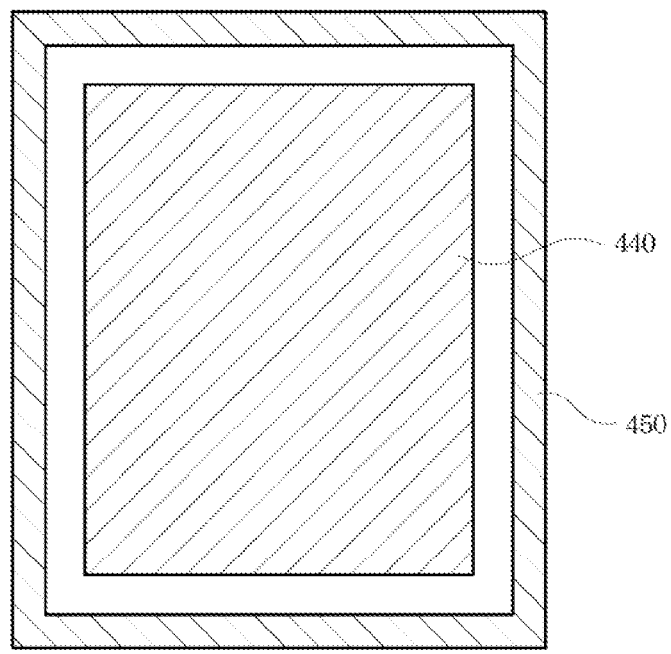
FIG. 4B is a top view illustrating a counter electrode of the photovoltachromic device shown in FIG. 4A.

FIG. 4A and FIG. 4B illustrate a counter electrode of the photovoltachromic device 400 according to another embodiment of the present invention. The photovoltachromic device 400 of this embodiment is substantially identical to the photovoltachromic device 300. The difference between them is an auxiliary conductive catalyst layer 450. By comparing with the auxiliary conductive catalyst layer 350, the auxiliary conductive catalyst layer 450 of this embodiment has a smaller surface area, and thus the surface areas of the auxiliary conductive catalyst layer 450 contacting the electrolyte layer and of the auxiliary conductive catalyst layer 350 contacting the electrolyte layer is compared to determine if the response times of these photovoltachromic devices are influenced thereby. Moreover, the auxiliary conductive catalyst layer 440 of this embodiment is electrically connected to the electrochromic layer 440 via the second transparent electrode 420 instead of directly contacting the electrochromic layer 440.

The transmittance spectra of above photovoltachromic devices are discussed below, as shown in FIG. 5 to FIG. 8.

Figure 1:
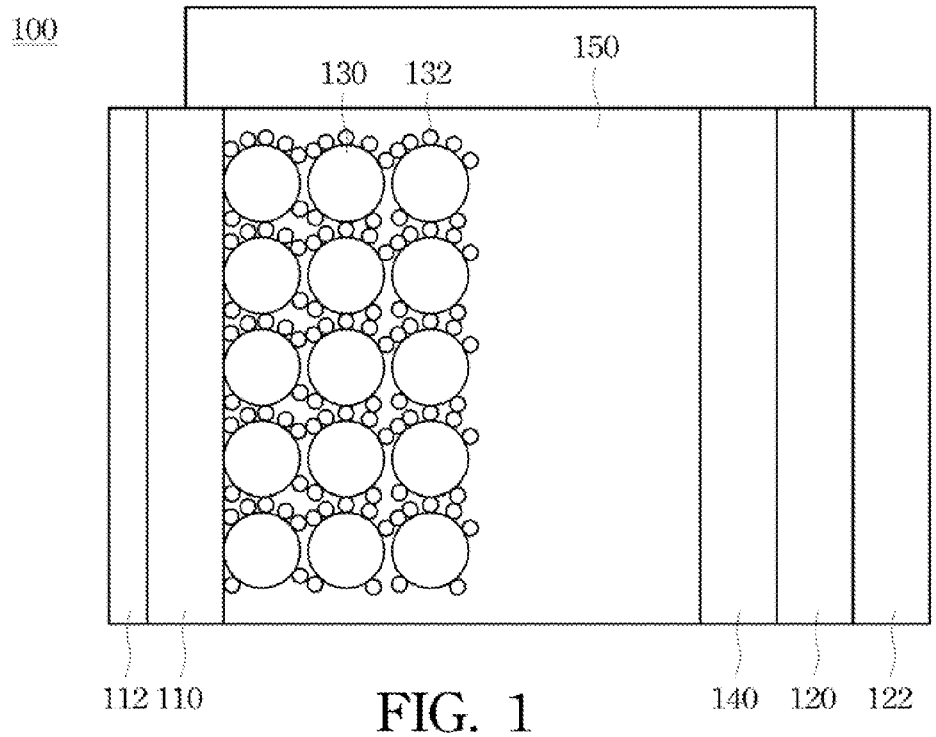
FIG. 1 is a schematic cross-sectional view illustrating a conventional photovoltachromic device.
Figure 5:
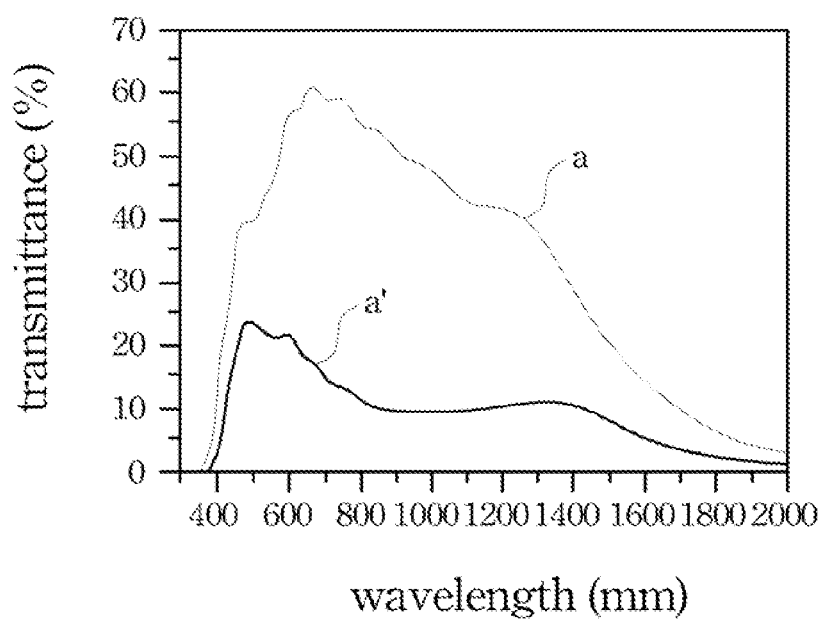
FIG. 5 shows visible/infrared transmittance spectra of the photovoltachromic device shown in FIG. 1.
Figure 6:
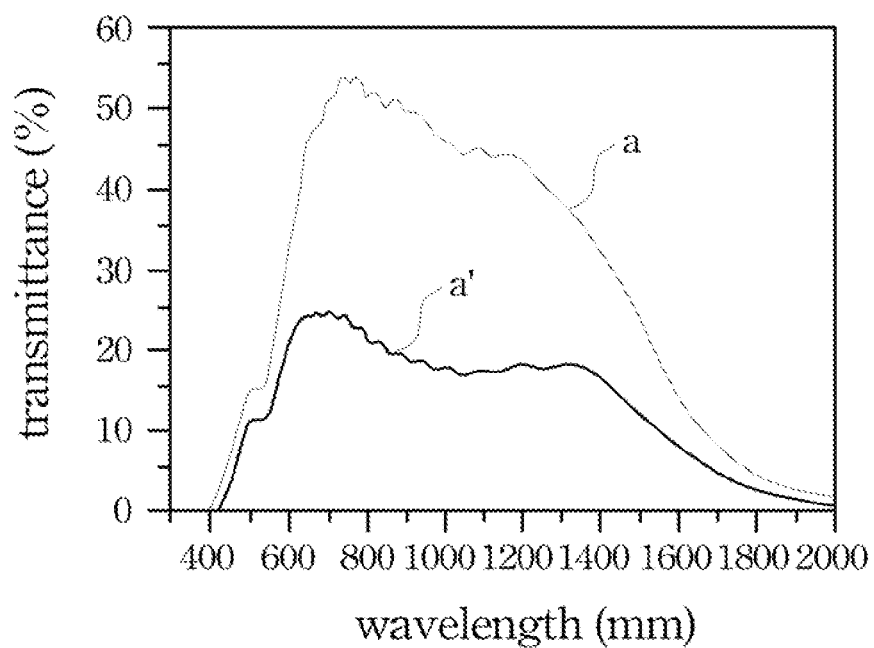
FIG. 6 shows visible/infrared transmittance spectra of the photovoltachromic device shown in FIG. 2A.
Figure 7:
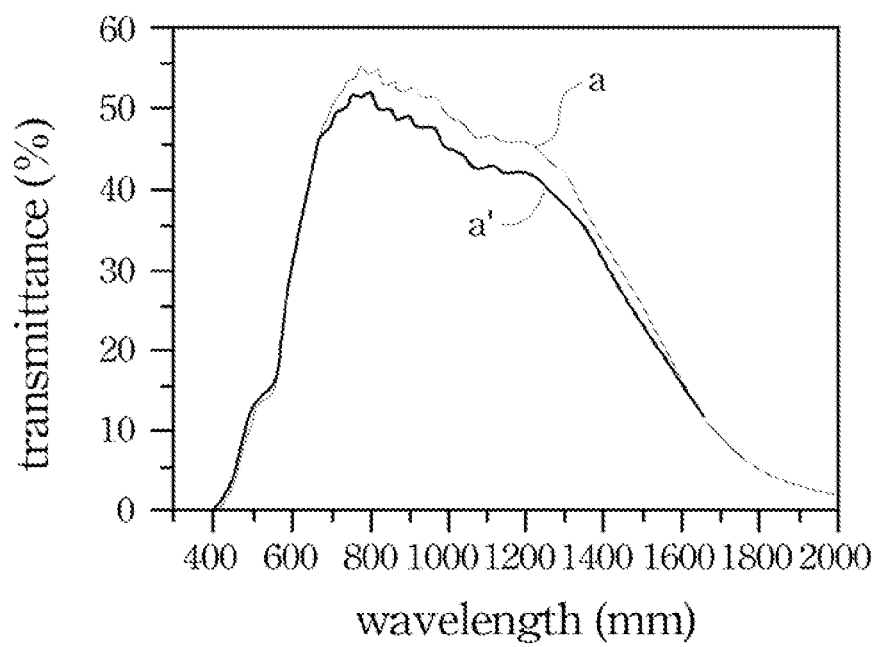
FIG. 7 shows visible/infrared transmittance spectra of the photovoltachromic device shown in FIG. 3A.
Figure 8:
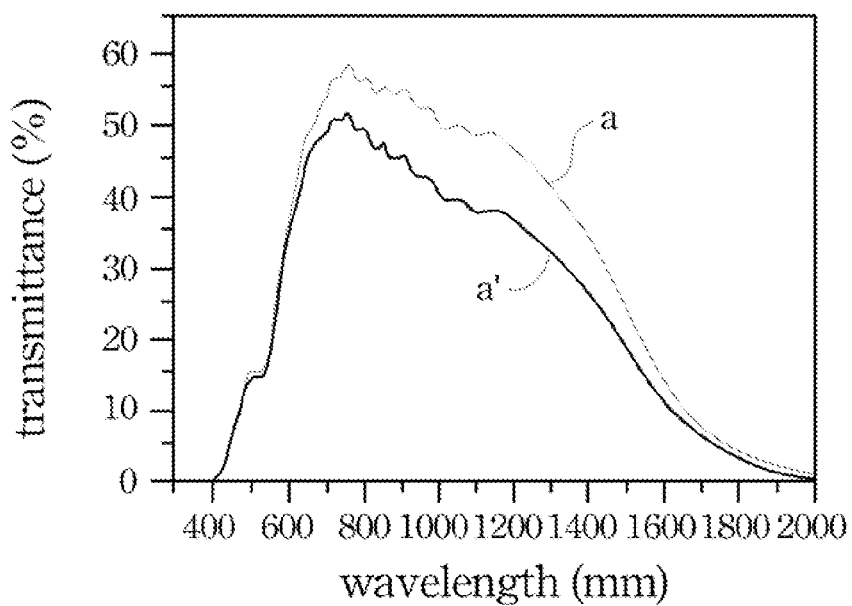
FIG. 8 shows visible/infrared transmittance spectra of the photovoltachromic device shown in FIG. 4A.

FIG. 5 illustrates the visible/infrared transmittance spectra according to the photovoltachromic device 100 of FIG. 1. FIG. 6 illustrates the visible/infrared transmittance spectra according to the photovoltachromic device 200 of FIG. 2A. FIG. 7 illustrates the visible/infrared transmittance spectra according to the photovoltachromic device 300 of FIG. 3A. FIG. 8 illustrates the visible/infrared transmittance spectra according to the photovoltachromic device 400 of FIG. 4A. As shown in FIG. 5 to FIG. 8, the curve a represents a transmittance of the photovoltachromic device under no light illuminated, and the curve a' represents a transmittance of the photovoltachromic device which has been light illuminated for 1 minute and has been bleached for ten minutes.

By comparing FIG. 5 with FIG. 6, the curve a' of FIG. 6 is slightly higher than the curve "a'" of FIG. 5. The difference between these two photovoltachromic devices is that the second transparent electrode 120 of the photovoltachromic device 100 is entirely covered by the electrochromic layer, but at least one portion of the second transparent electrode 220 of the photovoltachromic device 200 is exposed to contact the electrolyte layer. Therefore, it can be concluded that the at least one portion of the second transparent electrode 220 contacting the electrolyte layer 250 accelerates the redox reaction in the electrolyte layer 250, and thus the transmittance of the photovoltachromic device 200 response to light illumination is faster than the transmittance of the photovoltachromic device 100 response to light illumination.

By comparing FIG. 6 with FIG. 7, the curve a' of FIG. 7 is apparently higher than the curve a' of FIG. 6. The difference between these two photovoltachromic devices is that the photovoltachromic device 300 of FIG. 3 further includes an auxiliary conductive catalyst layer 350 formed from platinum. Therefore, it can be concluded that the existence of platinum accelerates the rate of the redox reaction in the electrolyte layer, and the rate of the redox reaction of platinum contacting the electrolyte layer is apparently faster than the rate of the redox reaction of indium tin oxide contacting the electrolyte layer of the photovoltachromic device 200 of FIG. 2A, such that the transmittance of the photovoltachromic device 300 of FIG. 3A response to light illumination is faster than the transmittance of the photovoltachromic device 200 of FIG. 2A response to light illumination.

By comparing FIG. 7 with FIG. 8, the curve a' of FIG. 8 is slightly lower than the curve a' of FIG. 7. The difference between these two photovoltachromic devices is that the surface area of the auxiliary conductive catalyst layer 450 of FIG. 4A contacting the electrolyte layer is smaller than the surface area of the auxiliary conductive catalyst layer 450 of FIG. 3A contacting the electrolyte layer. Therefore, it can be concluded that the surface area of the platinum contacting the electrolyte layer correlates with the rate of the redox reaction in the electrolyte layer. The surface area of the auxiliary conductive catalyst layer 450 is smaller, and thus the transmittance of the photovoltachromic device 300 response to light illumination is faster than the transmittance of the photovoltachromic device 400 response to light illumination.

Figure 9:
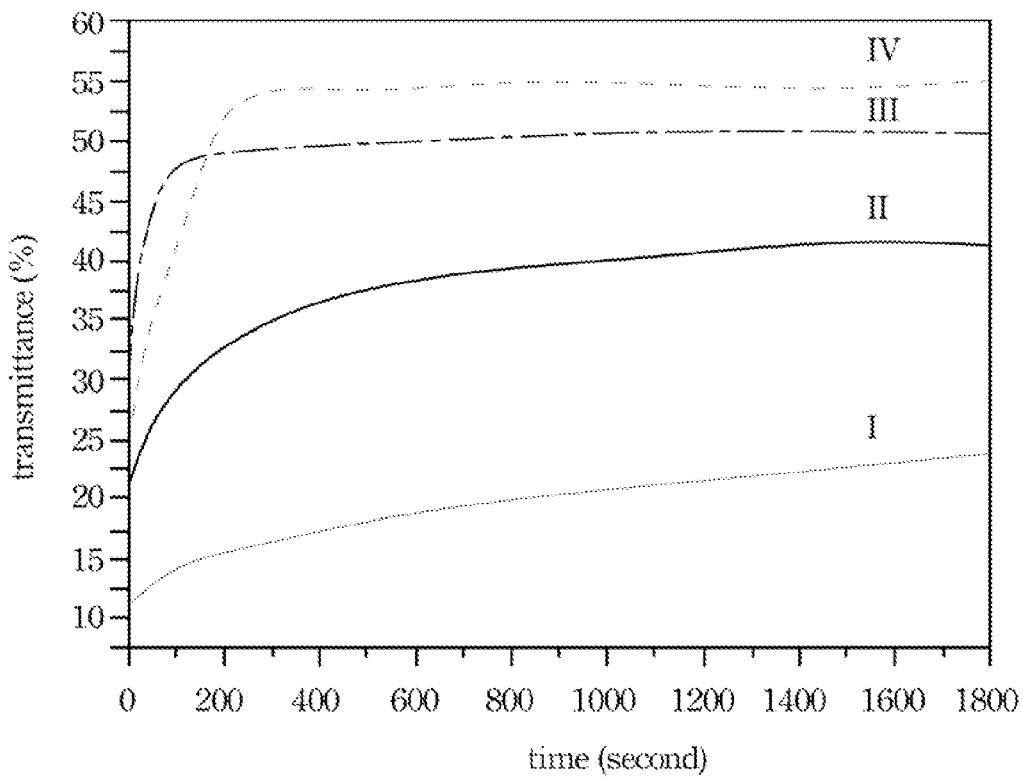
FIG. 9 illustrates curves for comparing response times of the respective photovoltachromic devices shown in FIG. 1 to FIG. 4A.

FIG. 9 illustrates curves for comparing response times of the respective photovoltachromic devices. The curve I represents the bleaching time of the photovoltachromic device 100 of FIG. 1. The curve II represents the bleaching time of the photovoltachromic device 200 of FIG. 2A. The curve III represents the bleaching time of the photovoltachromic device 300 of FIG. 3A. The curve IV represents the bleaching time of the photovoltachromic device 400 of FIG. 4A.

By comparing the curve I with the curve II, it can be concluded that since the second transparent electrode is not contacted the electrolyte layer, under the condition of no light illumination, the bleaching time of conventional photovoltachromic device 100 is slightly slower than the bleaching time of the photovoltachromic device 200.

By comparing the curve I and III, the difference between these two photovoltachromic devices is if the platinum contacts the electrolyte layer. In these embodiments, the bleaching time of the photovoltachromic device 300 contacting platinum is apparently faster. Therefore, there is an optimal state that the ratio of the surface area of the auxiliary conductive catalyst layer contacting the electrolyte layer to the surface area of the electrochromic layer contacting the electrolyte layer is substantially about 5:4. Alternatively, in another embodiment, the ratio of the surface area the auxiliary conductive catalyst layer contacting the electrolyte layer to the surface area of the electrochromic layer contacting the electrolyte layer is substantially from about 3:7 to about 1:1.

By comparing the curve II with the curve III and IV simultaneously, it can be observed that the response time of the photovoltachromic device 400 with the platinum contacting the electrolyte layer is faster than the response time of the photovoltachromic device 200 with the fluorine tin oxide contacting the electrolyte layer, but the response times of these two photovoltachromic devices are faster than the response time of conventional photovoltachromic device 100.

Figure 10:
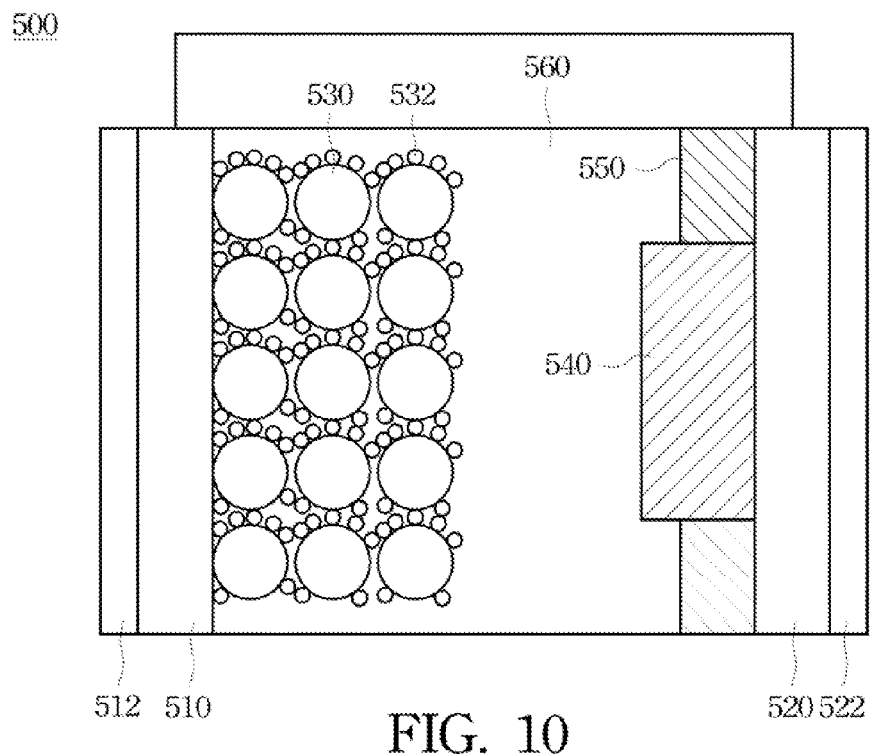
FIG. 10 is a schematic cross-sectional view illustrating a photovoltachromic device according to another embodiment of the present invention.

It is known through aforementioned embodiments that the bleaching time of the photovoltachromic devices of the present invention is better than the bleaching time of the photovoltachromic device 100. However, the photovoltachromic devices of aforementioned embodiments are less colored than the photovoltachromic device 100. For achieving a lower transmittance of the photovoltachromic devices of the present invention in colored state when being illuminated with visible light, the thickness of the electrochromic layer can be increased as the electrochromic layer 540 of FIG. 10.

Figure 11:
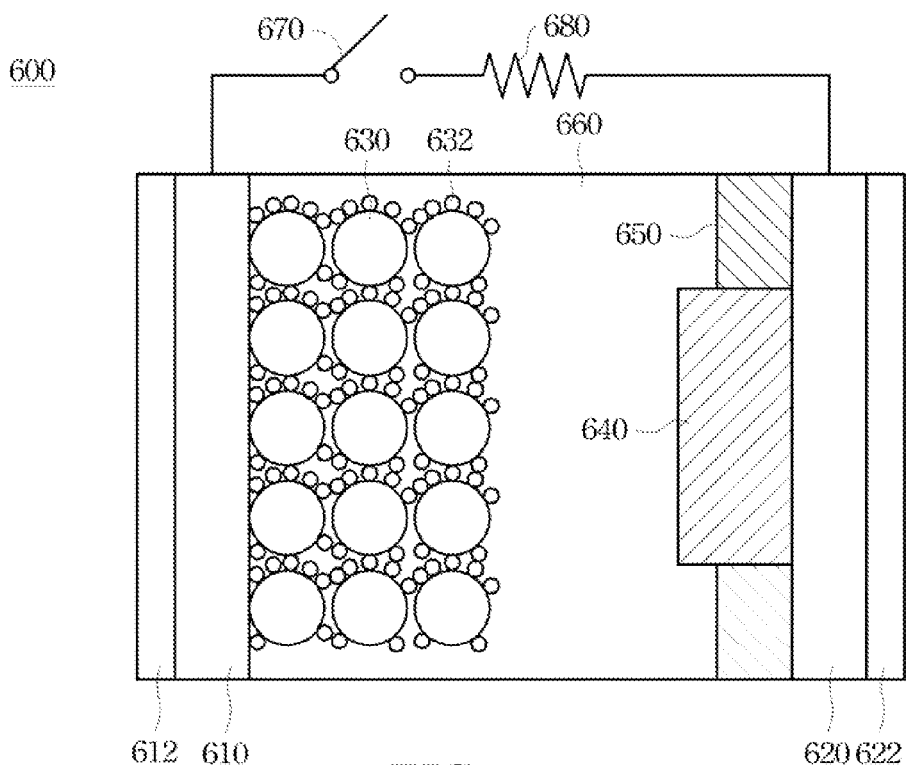
FIG. 11 is a schematic cross-sectional view illustrating a photovoltachromic device according to another embodiment of the present invention.

Since the property of the photovoltachromic device of the present invention is to transform the solar energy into electrical energy, i.e. photovoltaic characteristic, the current (I) and voltage (V) operated on the photovoltachromic devices of the present invention can be controlled by connecting an external circuit. For further details, according to one embodiment of the present invention as shown in FIG. 11, the photovoltachromic device 600 further includes a switch 670 and a variable resistor 680. The transmittance of the photovoltachromic under light illumination can be variable by adjusting the resistance.

Moreover, the photovoltachromic device of the present invention is further applied on a smart window provided with a window main body manufacturing from the photovoltachromic device of the present invention and a frame for fixing the window main body.

Figure 12:
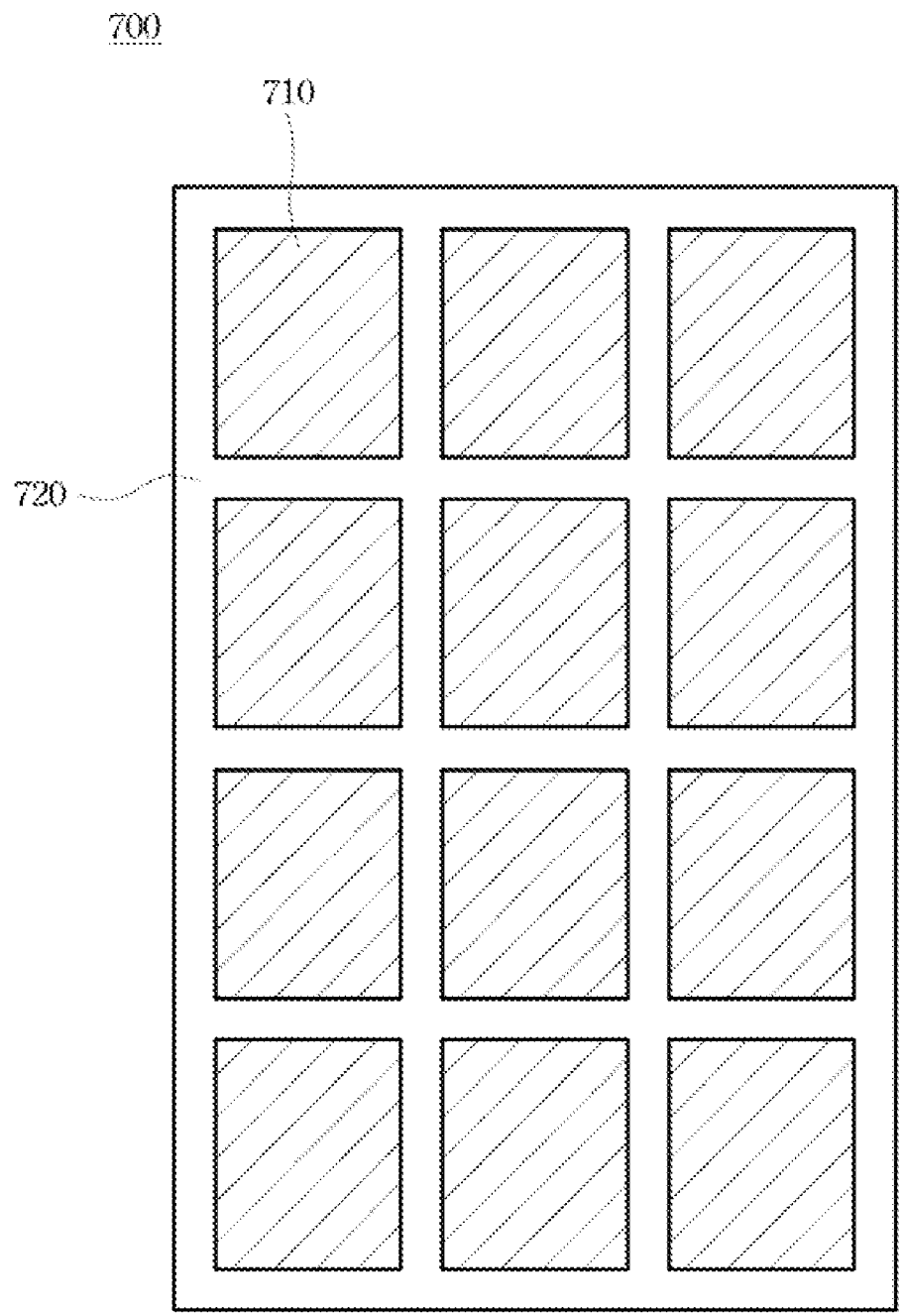
FIG. 12 is a top view illustrating a counter electrode of the photovoltachromic device according to another embodiment of the present invention.

FIG. 12 illustrates a counter electrode of the photovoltachromic device 700 applied on a smart window according to another embodiment of the present invention. The photovoltachromic device 700 is substantially identical to the photovoltachromic device 200. The difference between these two photovoltachromic devices is that the electrochromic layer on the counter electrode is divided into a plurality of blocks 710, and at least one portion of the second transparent electrode 720 is exposed among these blocks 710 and contacting the electrolyte 250. Therefore, these ions in electrolyte are reduced from $I_3^-$ anion to $I^-$ anion by the exposed transparent electrode among electrochromic blocks thereby transforming the light-absorbing dye adsorbed on the electrochromic blocks from an excited state to a steady state such that the rate of the solar energy transforming into electrical energy is accelerated.

Figure 13:
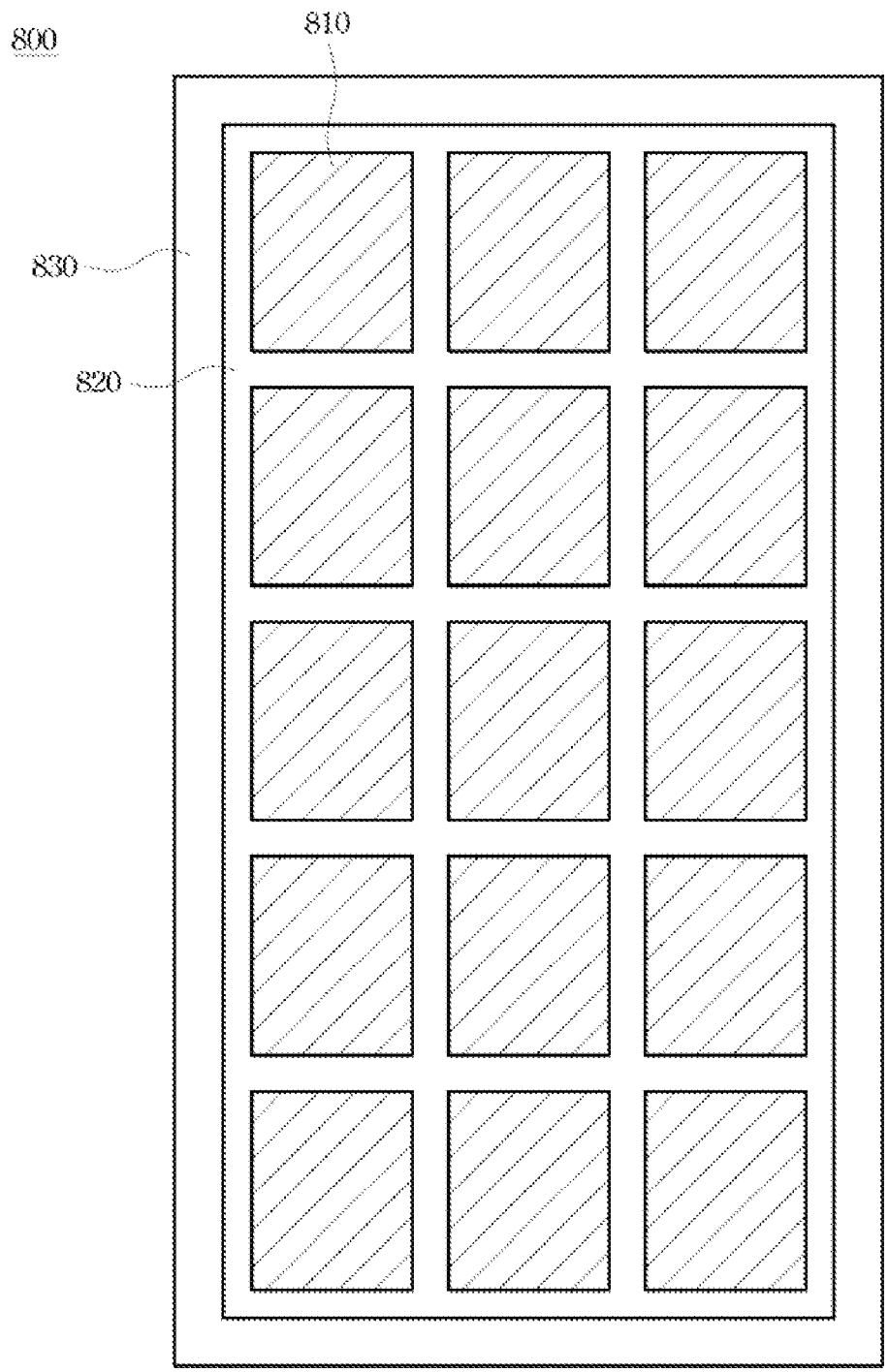
FIG. 13 is a top view illustrating a counter electrode of the photovoltachromic device according to another embodiment of the present invention.

FIG. 13 illustrates a counter electrode of the photovoltachromic device 800 applied on a smart window according to another embodiment of the present invention. The photovoltachromic device 800 is substantially identical to the photovoltachromic device 300. The difference between these two photovoltachromic devices is that the electrochromic layer on the second transparent electrode 830 is divided into a plurality of blocks 810, and the auxiliary conductively catalyst layer 820 is disposed in a network structure between the blocks 810. Therefore, these ions in electrolyte are reduced from $I_3^-$ anion to $I^-$ anion by the exposed transparent electrode between electrochromic blocks thereby transforming the light-absorbing dye adsorbed on the electrochromic blocks from an excited state to a steady state such that the rate of the solar energy transforming into electrical energy is accelerated. Once the smart window of the present invention is illuminated under the sun, the electrochromic layer of the photovoltachromic device can be darkened rapidly owing to the fast response time, so as to block the light illuminating into buildings, thereby raising the indoor temperature. Thus, the power of air conditioner can be saved in summer.

After all, the photovoltachromic device of the present invention is provided with fast coloring and bleaching response times, so that the transmittance of the electrochromic device can be finely tuned in a short time. Moreover, the dye-sensitized nano-structured technology can be integrated with the electrochromic coating technology according to one embodiment of the present invention. Electrical energy transformed from adsorbing solar energy supplies for electrical energy consumption of the coloration of electrochromic material thereby saving energy.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A photovoltachromic device comprising:
   a photoelectrode comprising a first transparent electrode, an electron-transport layer disposed on the first transparent electrode, and a sensitizing layer disposed on the electron-transport layer;
   a counter electrode electrically connected to the photoelectrode, wherein the counter electrode comprises a second transparent electrode and an electrochromic layer disposed on the second transparent electrode;
   an electrolyte layer disposed between the photoelectrode and the counter electrode; and
   an auxiliary conductive catalyst layer disposed on the second transparent electrode, wherein the auxiliary conductive catalyst layer contacts the electrolyte layer and the electrochromic layer.

2. The device of claim 1, wherein the sensitizing layer comprises quantum dots.

3. The device of claim 2, wherein each of the quantum dots is formed from a material selected from the group consisting of cadmium selenide (CdSe), cadmium sulfide (CdS), indium phosphide (InP) and indium arsenide (InAs).

4. The device of claim 1, wherein the sensitizing layer is formed from a light-absorbing dye.

5. The device of claim 4, wherein the light-absorbing dye is formed form a transition metal complex or an organic dye.

6. The device of claim 4, wherein the light-absorbing dye is formed from Ru-based dye or Os-based dye molecules.

7. The device of claim 1, wherein the electrochromic layer comprises a plurality of blocks, and at least one portion of the auxiliary conductive catalyst layer is disposed among the blocks.

8. The device of claim 1, wherein the ratio of the surface area of the auxiliary conductive catalyst layer contacting the electrolyte to the surface area of the electrochromic layer contacting the electrolyte layer is substantially from 3:7 to 1:1.

9. The device of claim 1, wherein the auxiliary conductive catalyst layer is formed from a material selected from the group consisting of tin dioxide, indium tin oxide, antimony tin oxide, fluorine tin oxide, iridium tin fluoride, zinc oxide, conductive carbon compound and the combination thereof.

10. The device of claim 1, the auxiliary conductive catalyst layer is formed from platinum.

11. A smart window, comprising:
   a window main body, comprising:
      a photovoltachromic device as claimed in claim 1; and
   a frame for fixing the window main body.

* * * * *